US009049964B2

(12) United States Patent
Baranoff

(10) Patent No.: US 9,049,964 B2
(45) Date of Patent: Jun. 9, 2015

(54) CHOPPING BOARD

(71) Applicant: Sergei C. Baranoff, West Sacramento, CA (US)

(72) Inventor: Sergei C. Baranoff, West Sacramento, CA (US)

( * ) Notice: Subject to any disclaimer, the term of this patent is extended or adjusted under 35 U.S.C. 154(b) by 200 days.

(21) Appl. No.: 13/901,939

(22) Filed: May 24, 2013

(65) Prior Publication Data

US 2013/0313350 A1 Nov. 28, 2013

Related U.S. Application Data

(60) Provisional application No. 61/651,133, filed on May 24, 2012, provisional application No. 61/653,410, filed on May 31, 2012.

(51) Int. Cl.
*A47J 47/00* (2006.01)
*A47J 43/25* (2006.01)

(52) U.S. Cl.
CPC .............. *A47J 47/005* (2013.01); *A47J 43/255* (2013.01)

(58) Field of Classification Search
USPC ................................... 269/289 R, 302.1, 900
See application file for complete search history.

(56) References Cited

U.S. PATENT DOCUMENTS

| 4,653,737 | A | * | 3/1987 | Haskins et al. | 269/13 |
| 5,363,755 | A | * | 11/1994 | Liang | 99/484 |
| 5,366,208 | A | * | 11/1994 | Benjamin | 269/13 |
| 5,938,185 | A | * | 8/1999 | Kletter | 269/289 R |
| 7,418,787 | B2 | | 9/2008 | Chen Lin | |
| 8,220,789 | B2 | * | 7/2012 | Pourounidis et al. | 269/289 R |
| 2008/0296823 | A1 | * | 12/2008 | Pourounidis et al. | 269/289 R |
| 2009/0200723 | A1 | * | 8/2009 | Lim et al. | 269/289 R |
| 2009/0243175 | A1 | | 10/2009 | Shew et al. | |
| 2012/0001376 | A1 | * | 1/2012 | Hsieh | 269/289 R |
| 2013/0119597 | A1 | * | 5/2013 | Sorensen | 269/289 R |
| 2013/0313350 | A1 | * | 11/2013 | Baranoff | 241/101.2 |

FOREIGN PATENT DOCUMENTS

| EP | 1162421 A1 | 12/2001 |
| JP | 11-169563 A | 6/1999 |
| JP | 2004-329498 A | 11/2004 |

OTHER PUBLICATIONS

PCT International Search Report and Written Opinion for PCT/US2013/042596, Aug. 23, 2013, 9 Pages.

* cited by examiner

*Primary Examiner* — Lee D Wilson
(74) *Attorney, Agent, or Firm* — Fenwick & West LLP

(57) ABSTRACT

A cutting board includes an opening for a rotatable disc. The rotatable disc may be inserted into the cutting board and allow a user to rotate food or other objects to be cut on the rotatable disc. This allows the user to maintain a cutting object, such as a knife, in a fixed location and rotate the rotatable disc to cut the object at varying angles. The rotatable disc can be interchanged with rotatable discs with various surfaces, such as a cutting surface for slicing or grating. The cutting board may also include a removable tray underneath the board for collecting food cut by the cutting surface.

12 Claims, 4 Drawing Sheets

CHOPPING BOARD

CROSS REFERENCE TO RELATED APPLICATIONS

This application claims the benefit of U.S. Provisional Application No. 61/651,133, filed May 24, 2012, and U.S. Provisional Application No. 61/653,410, filed May 31, 2012, each of which is incorporated by reference in its entirety.

BACKGROUND

This invention relates generally to food preparation stations and more particularly to chopping boards.

Presently, chopping boards are designed to be stationary and fixed during the act of cutting, chopping, slicing and otherwise preparing foods. During this preparation, food is moved about the board in order to complete chopping, slicing and cutting. Further, the user must manipulate a knife or other cutting object in many directions in order to cut food as desired. This wastes time and food as well as poses a safety risk as the user who must move the knife and food items, which poses potential risks for cuts and physical harm to the user.

Rather than helping users address these issues, standard practice is to allow the user to adapt to a stationary board. Accordingly, there is a longstanding need for an effective, non intrusive system that limits or completely eliminates the users need to twist and contort the body and or food product during the cutting, slicing, chopping and prepping process as well as provide adaptability for other cutting methods or blades.

SUMMARY

To address these problems, embodiments of the invention provide an effective modular system including a rotatable disc integrated into a portion of a cutting board that moves and rotates and is both easy to use change and clean. As the system is modular and includes nesting components, various embodiments provide flexibility in configuring the cutting system, providing a multi-faceted cutting surface, providing a more user friendly, ergonomic and safer cutting environment for the user. The cutting board is configured with an opening for inserting the rotatable disc and in various embodiments the rotatable disc includes a cutting element such as a slicer or grater. In one embodiment the cutting board includes a tray beneath the cutting board for collecting food cut by the cutting element.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
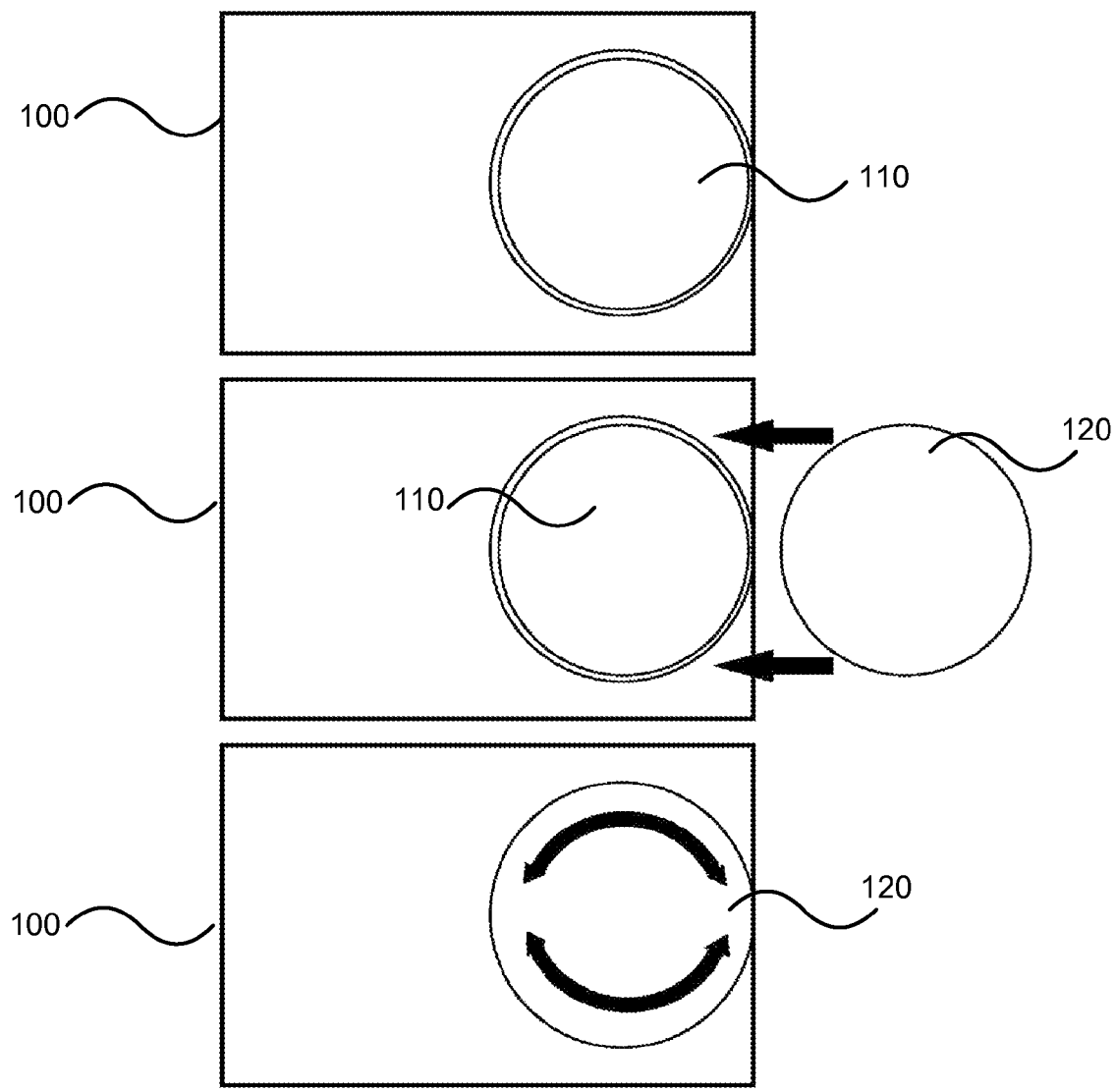
FIG. 1 is a top view of a cutting board according to one embodiment.

FIG. 1 is a top view of a cutting board 100 according to one embodiment. The cutting board includes a flat cutting surface, which includes an opening 110, which includes a ledge with male and female anchors and in which a rotational disc 120 may be inserted. The base of the rotational disc 120 attaches to the anchors in the cutting board 100 but allows the top of the rotational disc 120 to freely rotate. When inserted, the top of rotational disc 120 may rise above the surface of the cutting board 100 or may be flush with the surface. The rotational disc 120 is designed to allow items (e.g., food) desired to be cut to rotate about the vertical axis a uniform 360 degrees without the items being re-arranged by the user. This allows a user to slice an object in one direction and rotate the rotational disc 120 to slice the object from another direction without manually moving the food The top of the rotational disc 120 and cutting board 100 surface may be comprised of either metal, plastic, wood or other suitable materials that are sanitary and easy to clean. The top of the rotational disc 120 may differ from the bottom of the rotational disc 100 and differ from the portions that anchor the rotational disc 120 to the opening 110 from one another in material, color, and texture. The rotational disc 120 may further include textural indicators on the surface as well as ridges, bumps or indentations that correspond to the ledge of the opening 110, in order to provide lesser friction during rotation or the ability to secure the disc in a fixed place. The disc may also be used independently apart from the cutting board 100. These alternatives may be used alone or in conjunction with another.

Figure 2:
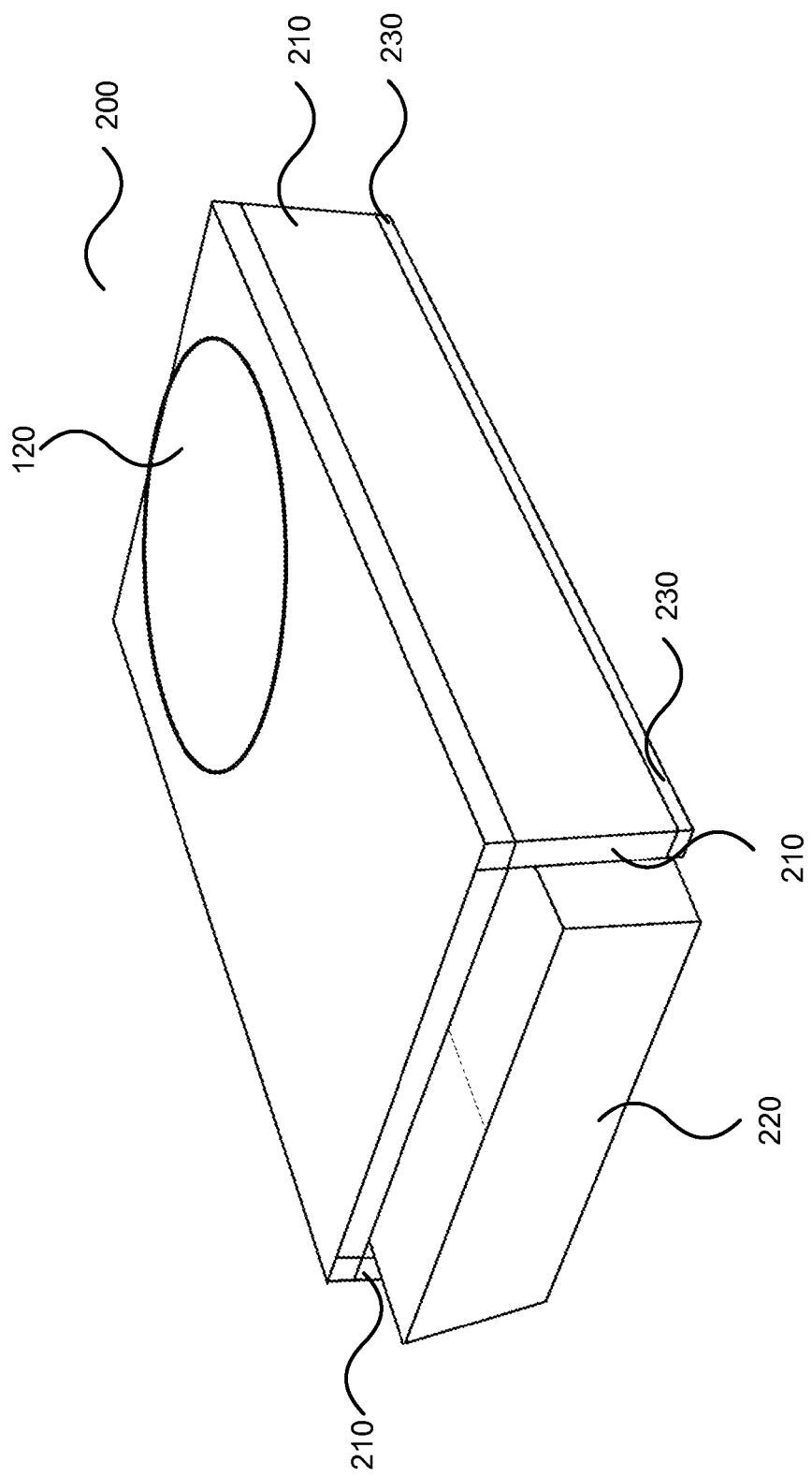
FIG. 2 illustrates a raised cutting board system including an opening for a rotational disc.

In another embodiment, FIG. 2 illustrates a raised cutting board system 200 including an opening 110 for a rotational disc 120. The raised cutting board system 20 is supported by sidewalls 210. The raised cutting board facilitates the free rotation of the rotational disc 120 by clearing the bottom of the rotational disc 120 from a surface on which the cutting board system 200 rests. In addition, a tray 220 can be inserted under the cutting board surface and under the rotational disc 120. The sidewalls 210 may include an interior track or rail (not shown) on which the tray 220 slides to move the tray 220 within the enclosure created by the sidewalls 210 and cutting board top. The increased height of the raised cutting board system 200 may cause the system to shift and move and as such a stabilizing material 230 such as a rubber membrane, silicone nubs or other suitable material may be affixed, inserted or molded into the bottom ledge of the sidewall 210 to facilitate stability. A bottom may be included connecting the sidewalls to further improve stability.

Figure 3:
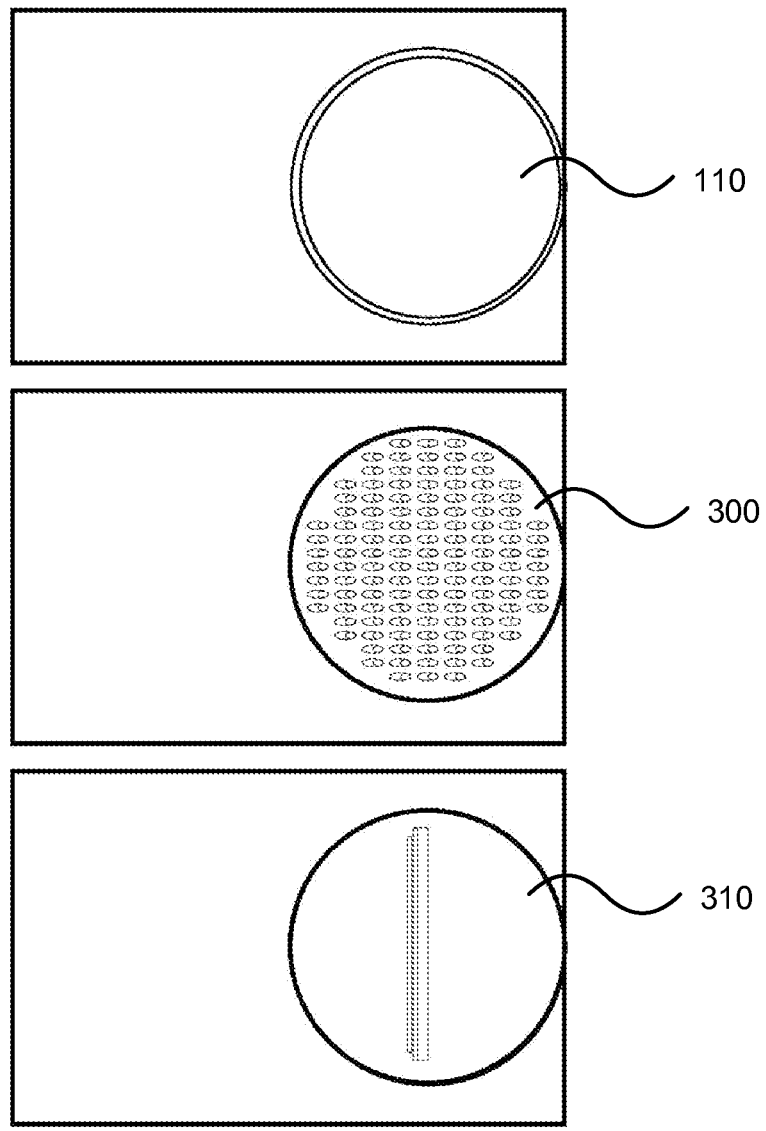
FIG. 3 shows a set of rotatable discs that facilitate various functions.

In another embodiment, FIG. 3 shows a set of rotatable discs that facilitate various functions. The rotatable discs include a flat rotatable disc 300 for cutting, a grating surface 310, and a slicing blade 320. The grating surface 310 and the slicing blade 320 slice portions of an object run over the surface. The grating surface 310 and slicing blade 320 when used in the raised embodiment shown in FIG. 2 are configured such that the sliced object drops into the tray 220. This allows a user to slice food with a cutting element on the rotational disc and easily collect the sliced food in the tray 220. The various discs may also operate in a fixed position or by rotating within the opening 110.

Figure 4:
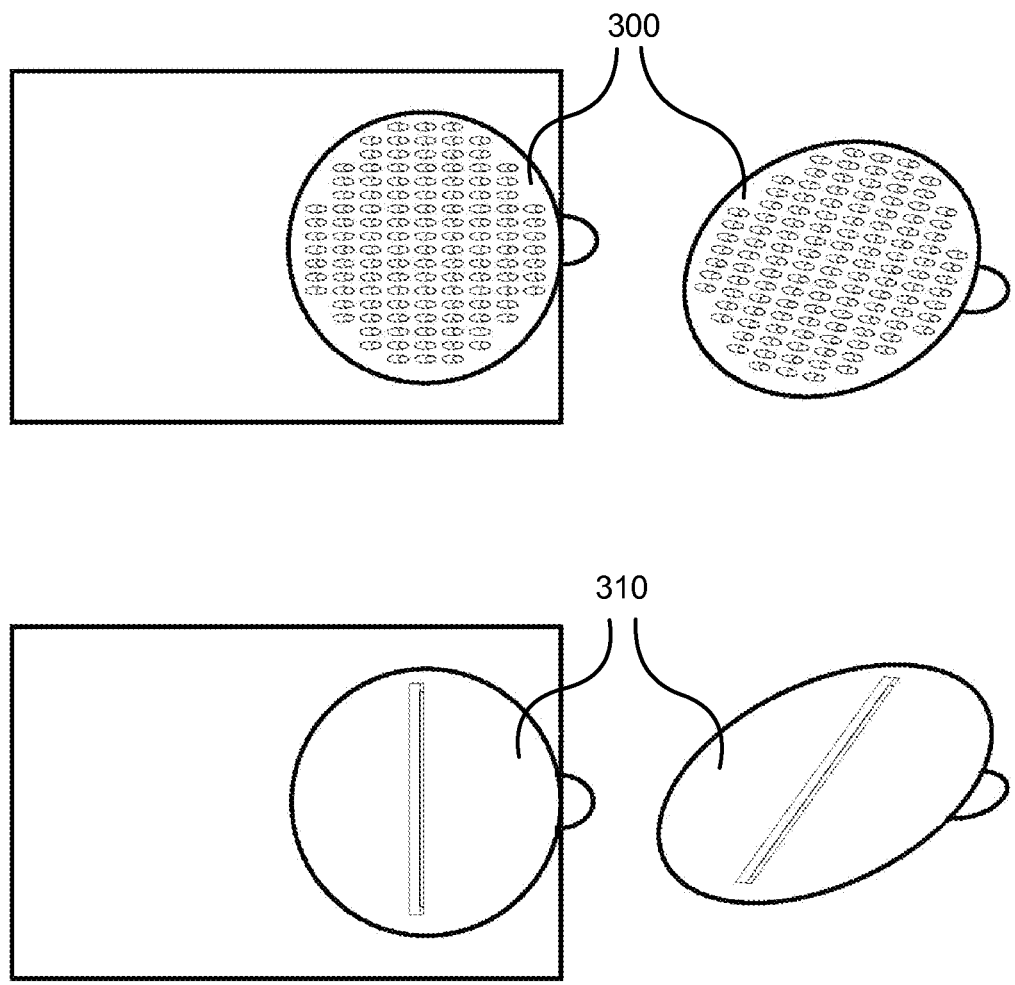
FIG. 4 shows various embodiments of a rotatable disc including a handle.

FIG. 4 illustrates various embodiments of a rotatable disc including a handle. As shown in FIG. 4, rotatable discs with a grating surface 300 or a slicing blade 310 may be removed from the cutting board and used separately. These can beneficially be used alone with the use of a handle or other form of handling, formed of co-molded rubber, neoprene, plastic or the like.

Similarly as the system shown in FIG. 2 is raised, it is beneficial for the food being manipulated to drop into the storage containers below or directly into other suitable containers, during actions such as grating and shredding. Further the opening 110 may provide seating for a multitude of other discs which nest into the ledge, such as elements for juicing citrus, creating spiral cuts and or providing for the ability to heat or cool the discs.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A cutting board system comprising:
   a cutting board including an opening and a ledge within the opening for removably receiving a rotatable disc;
   a first and second sidewall affixed to the cutting board forming an enclosure;
   a tray enclosed within an enclosure and slidable within the enclosure; and
   a set of rotatable discs shaped for insertion within the opening, the set including a rotatable disc with a flat cutting surface on which to cut food and a rotatable disc with a cutting element for slicing food;
   wherein when the tray is fully inserted, the tray lies underneath the opening in the cutting board, and when a rotatable disc is inserted within the opening, the rotatable disc is permitted to rotate within the opening.

2. The cutting board system of claim 1, wherein the rotatable disc is removably attached to the ledge using anchors.

3. The cutting board system of claim 1, wherein, when a rotatable disc is inserted within the opening, the rotatable disc can be held fixed.

4. The cutting board system of claim 1, wherein the cutting element comprises a slicer.

5. The cutting board system of claim 1, wherein the cutting element comprises a grater.

6. The cutting board system of claim 1, wherein the rotatable disc is circular.

7. The cutting board system of claim 1, wherein the tray is removable from the enclosure.

8. The cutting board system of claim 1, wherein the tray is slidable within a pair of rails affixed to the first and second sidewall.

9. A cutting board comprising:
   a cutting board including a flat cutting surface, a circular opening, and a ledge within the circular opening; and
   a disc removably insertable within the opening, such that when the disc is inserted within the opening, the disc is rotatable within the opening.

10. The cutting board of claim 9, wherein when the disc is inserted within the opening, a top surface of the disc is flush with the flat cutting surface of the cutting board.

11. The cutting board of claim 9, wherein the disc includes a cutting element.

12. The cutting board of claim 9, wherein the disc includes a handle.

* * * * *